US006329490B1

(12) United States Patent
Yamashita et al.

(10) Patent No.: US 6,329,490 B1
(45) Date of Patent: Dec. 11, 2001

(54) POLYHEDRAL ORGANOSILICON COMPOUND AND METHOD FOR PRODUCING THE SAME

(75) Inventors: Yukiya Yamashita; Kenji Hayashi, both of Omiya; Masaoki Ishihara, Ohtawara, all of (JP)

(73) Assignees: Mitsubishi Materials Corporation, Tokyo; Dai Nippon Toryo Co., Ltd., Ohtawara, both of (JP)

( * ) Notice: Subject to any disclaimer, the term of this patent is extended or adjusted under 35 U.S.C. 154(b) by 0 days.

(21) Appl. No.: 09/540,285

(22) Filed: Mar. 31, 2000

(30) Foreign Application Priority Data

Mar. 31, 1999 (JP) .................................................. 11-093459
Apr. 1, 1999 (JP) .................................................. 11-095275

(51) Int. Cl.$^7$ .................................................. C08G 77/24
(52) U.S. Cl. .......................... 528/42; 556/458; 556/460; 556/41; 528/32; 528/30; 528/38; 528/20; 528/21; 528/12; 528/549; 528/251
(58) Field of Search ................................... 556/458, 460, 556/414; 528/32, 30, 20, 38, 42, 21, 12; 549/215

(56) References Cited

FOREIGN PATENT DOCUMENTS 4-122731    4/1992    (JP) .

OTHER PUBLICATIONS

Mark, Encyclopedia of Polymer Science and Engineering, vol. 15, Wiley–Interscience, 1989, pp. 224–225.
Eckhard Rikowski et al, "Cage–rearrangement of silsesquioxanes" *Polyhedron,* vol. 16, No. 19, pp. 3357–3361, 1997.

*Primary Examiner*—Robert Dawson
*Assistant Examiner*—Kuo-Liang Pang
(74) *Attorney, Agent, or Firm*—Oblon, Spivak, McClelland, Maier & Neustadt, P.C.

(57) ABSTRACT

Disclosed are polyhedral organosilicon compounds which are possible to be polymerized and can form a film excellent in adhesiveness to a substrate, having a high hardness, a high transparency and having water and oil repellency, and comprise organofluoro groups or both of organofluoro groups and reactive functional groups, the compounds being soluble in an organic solvent and stable.

Organosilicon compounds which have perfluoroalkyl groups or both perfluoroalkyl groups and reactive functional groups and which have a polyhedral structure have the following formulas of (I), (II) and (III):

$$[Rf1-X1-(CH_2)_a-SiO_{1.5}]_m \quad (I)$$
$$[Rf1-X1-(CH_2)_a-SiO_{1.5}]_m[Rf2-(X2)_c-(CH_2)_b-SiO_{1.5}]_n \quad (II)$$
$$[Rf1-X1-(CH_2)_a-SiO_{1.5}]_m[R-(X2)_c-(CH_2)_b-SiO_{1.5}]_n \quad (III)$$

wherein each of Rf1 and Rf2 represents a perfluoroalkyl group, R represents a functional group, each of X1 and X2 represents a divalent bonding group, each of a and b represents 0 or an integer of up to 10, c represents 0 or 1, each of m and n represents an integer of 1 to 19 and m+n is an integer of 4 to 20.

25 Claims, 1 Drawing Sheet m or (m+n) = 12 m or (m+n) = 8

● Si
○ O
◎ Organic Group having Perfluoroalkyl Group

POLYHEDRAL ORGANOSILICON COMPOUND AND METHOD FOR PRODUCING THE SAME

BACKGROUND OF THE INVENTION

1. Field of the Invention

The present invention relates to a cage shaped-polyhedral organosilicon compound having organofluoro groups (perfluoroalkyl groups), or organofluoro groups and reactive functional groups and to a method for producing the same, and to a material for forming a film comprising the polyhedral organosilicon compound and to a film formed using the material for forming a film comprising the polyhedral organosilicon compound. The polyhedral organosilicon compound of the present invention is useful as a material for forming a film which enables one to employ any one of a dry method or a wet method for forming a film. The organosilicon compound has a low dielectric constant and refractive index and exhibits water and oil repellency. Using the organosilicon compound, patterning can be done and a film having a high hardness can be provided which has excellent heat resistance and fire resistance.

2. Description of the Background

Polyorganosiloxanes are polymers in which organic groups are bonded to silicon having a siloxane bond structure. The polymers have excellent thermal properties such as heat resistance and cold resistance, as well as repellent surface properties. Polyorganosiloxanes have been used in various fields of application in the form of silicone resins, rubbers, oils and the like. Structural units of polyorganosiloxanes comprise four types, from one functionality to four functionalities. Polyorganosiloxane compounds are formed which have a chain structure, a cyclic structure, a cage structure or a three-dimensional network structure corresponding to the various structural units. Of these compounds, compounds having the cage structure comprise a structural unit of three functionalities ($RSiO_{3/2}$) and is called as (poly)silsesquioxane. The compounds are expected to be used in various ways including new uses since the compounds have properties different from those of polymers which comprise a single compound.

In general, the above-mentioned (poly)silsesquioxane is prepared by hydrolysis and dehydration-condensation of silane monomers. In the case of using the (poly)silsesquioxane to form a film, it is possible to change film properties by changing the composition of alkyl groups remaining after hydrolysis or by introducing various substituents into the alkyl groups.

Accordingly, a possibility is to use a (poly)silsesquioxane in various ways, more than for the preparation of inorganic silica films which are prepared from four-functional silane monomers. For example, a film having water and oil repellency, which properties are attributable to organofluoro groups, can be prepared from (poly)silsesquioxanes bearing fluoroalkyl groups.

However, the materials which are used for the formation of a film are synthesized from three-functional group containing silane monomers containing organofluoro groups by conventional methods. The materials can not compose macromolecules with the result that the films obtained from the materials exhibit a low hardness and can not be put to practical use. In addition, the films prepared exhibit low water stability and have problems such as denaturation and precipitation during storage. Polymers comprising these materials have not been used as film-forming materials.

Polymers containing fluorine such as poly (tetrafluoroethylene) are conventionally used as materials which impart water and oil repellency to the surfaces of substrate materials. However, these kinds of polymers have a problem in that it is difficult to use them as film-forming materials, since the polymers are not sufficiently adhesive to substrates and have low solubility in organic solvents.

SUMMARY OF THE INVENTION

Accordingly, one object of the present invention is to provide an organosilicon compound, especially an organosilicon compound having perfluoroalkyl groups, which is suitable as a material for forming films of excellent quality which have excellent adhesiveness to substrates and which have water and oil repellency, a low dielectric constant, a high thermal stability, a high hardness and a high transparency, and can be stably preserved in the form of solution.

Another object of the present invention is to provide a method for the preparation of organosilicon compounds.

Still another object is to provide uses for the organosilicon compound of the invention.

Briefly, these objects and other objects of the present invention as hereinafter will become more readily apparent can be attained by a perfluoroalkyl group containing organosilicon compound having a polyhedral structure and having formula (I):

  (I), wherein Rf1 is a $C_{1-20}$-perfluoroalkyl, X1 is a divalent bonding group, a is 0 or an integer of up to 10, and m is an integer of 4 to 20; a perfluoroalkyl group containing organosilicon compound having a polyhedral structure and having formula (II):

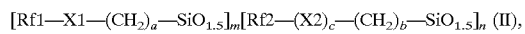  (II), wherein each of Rf1 and Rf2 is a $C_{1-20}$-perfluoroalkyl group, each of X1 and X2 is a divalent bonding group, each of a and b is 0 or an integer of up to 10, c is 0 or 1, each of m and n is an integer of 1 to 19 and m+n is an integer of 4 to 20, and at least one combination selected from the group consisting of Rf1 and Rf2, X1 and X2, and a and b is such that the members of the group are not the same; and a perfluoroalkyl group containing organosilicon compound which contains reactive functional groups, has a polyhedral structure and has formula (III):

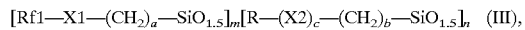  (III), wherein Rf1 is a $C_{1-16}$-perfluoroalkyl group, R is a reactive functional group, each of X1 and X2 is a divalent bonding group, each of a and b is 0 or an integer of up to 10, c is 0 or 1, each of m and n is an integer of 1 to 19 and m+n is an integer of 4 to 20.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

As mentioned above, compounds comprised of siloxane bonds (Si—O—Si), that is, polysiloxanes, are classified into four types which are chain polysiloxanes, cyclic polysiloxanes, ladder type polysiloxanes and polyhedral (cage type) polysiloxanes.

Figure 1:
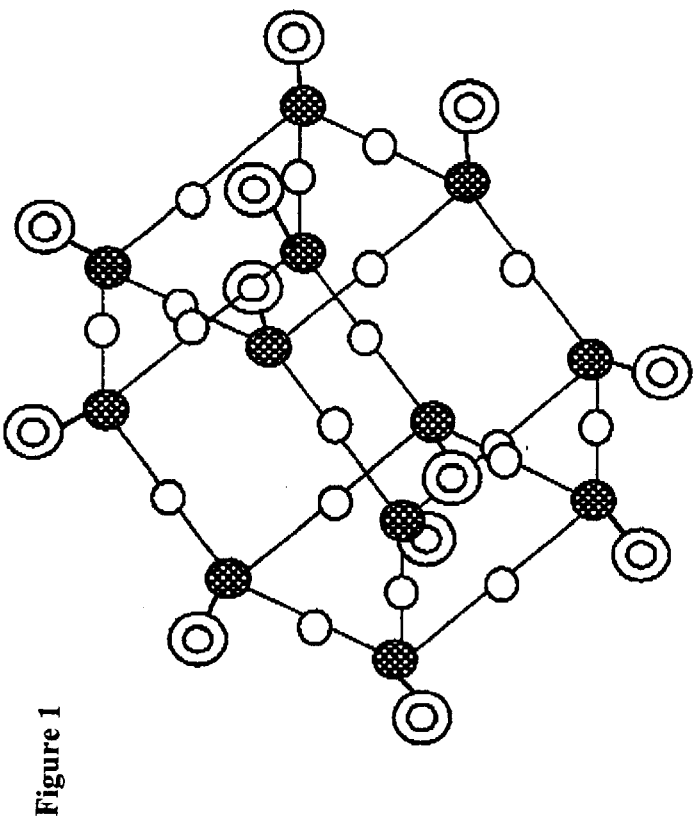
FIG. 1 shows two structural views of the compounds of the present invention.
Figure 1:
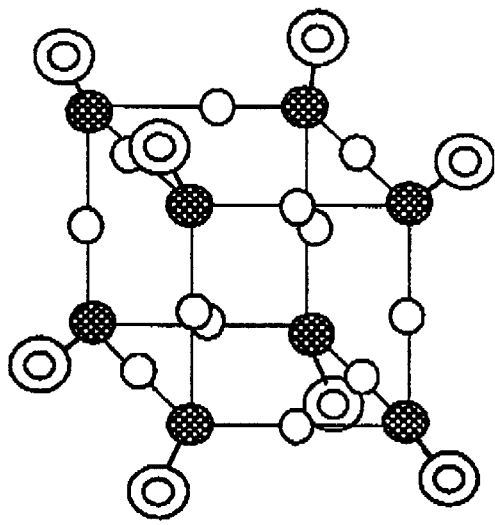

Polysiloxanes having a cage-polyhedral structure are organosilicon compounds having the formula: $(RSiO_{1.5})_m$ and are generally called silisesquioxanes. In the formula, R is an organic group and m is an integer. The compounds are prepared by hydrolysis and condensation of three-functional group containing silane compounds. The structures of polyhedral silane compounds are shown in FIG. 1 which are cases where m, in the instance of compounds having formula (I), or m+n, in the instance of compounds having formula (II) or (III), is 8 or 12.

With regard to organosilicon compounds having polyhedral structures, compounds in which the symbol ⊙ is an alkyl group, a monofluoro-substituted alkyl group or a perfluorophenyl substituted alkyl group, are reported in Polyhedron, Vol.16, No.19, pp.3357–3361 (1997) by Eckhard Rikowski et al. However, compounds having perfluoroalkyl substituted alkyl groups are not yet know for reasons estimated as follows. As mentioned above, as the solubility of perfluoroalkyl group containing silane compounds in organic solvents greatly decrease as the degree of polymerization of the polymer increases as hydrolysis and condensation reactions occur, it is difficult for the hydrolysis to proceed and for the condensation reactions to proceed sufficiently to provide a polyhedral structure, in comparison to silane compounds where alkyl groups are not substituted, i.e., contain only hydrogen atoms In the present invention, the synthesis of polysiloxane compounds having a polyhedral structure, which have perfluoroalkyl groups, is prepared by conducting hydrolysis and condensation reactions in an organic solvent having at least one element selected from the group consisting of O, N, F and Cl in the presence of water and a basic compound, while the synthesis of the compounds can not be achieved by the conventional method. As a result, organosilicon compounds having a polyhedral polysiloxane structure having formula of I, II or III are available from three-functional type monomers having perfluoroalkyl groups of formulas IV, V or VI. These formulas are shown below.

According to the present invention, polyhedral organosilicon compounds are provided wherein three-functional group containing type monomers containing perfluoroalkyl groups can be used as a raw material for polymer synthesis, and that a film can be formed which has high hardness, has excellent film forming properties and adhesiveness to a base material and which has water and oil repellency. Further, the polyhedral organosilicon compounds can be stably preserved in the state of solution.

Trialkoxysilane type organosilicone compounds having perfluoroalkyl groups can be prepared by substituting perfluoroalkyl groups for alkyl groups in the monoalkyltrialkoxysilane compounds. However, good films from such compounds can not be solved as a good film can not be prepared even if the film is formed using a material which is obtained by the hydrolysis and condensation of the above-mentioned compounds in the presence of an acid catalyst by the conventional method, as mentioned above. In addition, the hydrolysates of the compounds exhibit low stability.

Three-group substituted type compounds containing perfluoroalkyl groups have another problem. That is, with regard to this type of compound which has perfluoroalkyl groups, it is difficult to proceed with hydrolysis in comparison to hydrocarbon silane compounds and hydrogen silane compounds in which hydrogen is present and which is not substituted by alkyl groups, since the solubility thereof in an organic solvent greatly decreases with increases in polymerization accompanied by hydrolysis and condensation.

The present inventors have found, by chance, that an organosilicon compound having a cage- polyhedral structure is produced by hydrolysis and condensation of a trialkoxysilane compound having perfluoroalkyl groups in a specific solvent in the presence of a basic catalyst, in which the reaction smoothly proceeds. Since the organosilicon compound can be dissolved in a specific solvent, both wet methods such as spin coating and dry methods such as deposition can be used for film formation using the compound and an excellent film can be obtained upon film-formation. The film which is formed has excellent heat resistance and fire resistance in comparison to hydrocarbon resin films, since the film is composed of a structure mainly having siloxane bonds. Since the film exhibits water and oil repellency because of the presence of perfluoroalkyl groups, as well as a low refractive index and a low dielectric constant and a high transparency, the film is useful as a film which has low reflectivity and a film which has a low dielectric constant. Furthermore, since the film can be dissolved in a specific solvent, an etching treatment can be applied, and if coloring matter is included therein, the film can also be used for patterning using heat such as provided by a laser.

The present invention is directed to organosilicon compounds which have perfluoroalkyl groups or both perfluoroalkyl groups and reactive functional groups and which have a polyhedral structure as shown in the following formulas of (I), (II) and (III). It is also directed to a method for producing the compounds and to uses of the compounds.

$[Rf1—X1—(CH_2)_a—SiO_{1.5}]_m$                      (I)

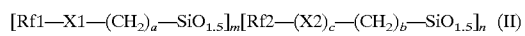

$[Rf1—X1—(CH_2)_a—SiO_{1.5}]_m[Rf2—(X2)_c—(CH_2)_b—SiO_{1.5}]_n$    (II)

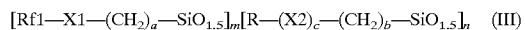

$[Rf1—X1—(CH_2)_a—SiO_{1.5}]_m[R—(X2)_c—(CH_2)_b—SiO_{1.5}]_n$    (III)

wherein each of Rf1 and Rf2 represents a perfluoroalkyl group, R represents a functional group, each of X1 and X2 represents a divalent bonding group, each of a and b represents 0 or an integer of up to 10, c represents 0 or 1, each of m and n represents an integer of 1 to 19 and m+n is an integer of 4 to 20.

Organosilicon compounds represented by formula (I) can be produced by subjecting a compound represented by formula (IV), as shown below, to hydrolysis and condensation reactions in an organic solvent including at least one element selected from the group consisting of O, N, F and Cl in the presence of water and a basic compound.

Organosilicon compounds represented by formulas (II) and (III) can be produced by subjecting a compound represented by formula (IV), as shown below, with a compound represented by formula (V) or (VI) to hydrolysis and condensation reactions in an organic solvent containing at least one element selected from the group consisting of O, N, F and Cl in the presence of water and a basic compound.

$Rf1—X1—(CH_2)_a—Si(Y)_3$                      (IV)

$Rf2—(X2)_c—(CH_2)_b—Si(Y)_3$                  (V)

$R—(X2)_c—(CH_2)_b—Si(Y)_3$                    (VI), wherein Y represents a $C_{1-5}$-alkoxy group or chlorine, and Rf1, Rf2, R, X1, X2, a, b and c are the same as described above.

In the formulas above, X1 is preferably selected from the group consisting of —$CH_2$—, —O—, —N(R1), —S—, —COO—, —$SO_2$N(R1)— and CON(R1)—, where R1 is hydrogen or a $C_{1-10}$-alkyl group or a $C_{1-10}$-alkenyl group.

Rf is a perfluoroalkyl group, preferably having 1 to 10 carbon atoms, more preferably 2 to 8 carbon atoms. Perfluoroalkyl groups having more carbon atoms provide films having a higher hydrophobicity.

Y in the above-mentioned formulas (IV) to (VI) is preferably a $C_{1-5}$-alkoxy group or chlorine, more preferably a methoxy group, an ethoxy group or chlorine. Three Y groups may be the same or different.

In a reaction, an organosilicon compound represented by formula (I) and having a polyhedral polysiloxane structure is prepared from a three-functional group, one of which is a perfluoroalkyl group, containing silane monomer represented by formula (IV) by hydrolysis and condensation in water and in the presence of a base,

   (IV)

   (I)

wherein Rf, X1, a, Y and m are the same as described above.

Of the organosilicon compounds represented by formula (I), preferred are compounds which are represented by the formula: $(Rf—CH_2—CH_2—SiO_{1.5})_m$, wherein X1=—$CH_2$—, a=1 and also preferred are compounds wherein X1—CONH— or $SO_2N(C_3H_7)$, and a=3. In the formula, m is preferably 8 to 16.

An aspect of preparing the compounds of the present invention represented by formula (II), polyhedral organosilicon compounds having formula (II) with different organic groups including perfluoroalkyl groups in one molecule, can be prepared by using, as a starting material, several types of three, functional group containing monomers, that is, different from each other, represented by formulas (IV) and (V) respectively, each having a perfluoroalkyl group, and by subjecting the starting material to hydrolysis and condensation reactions in water and in the presence of base in the same manner as in the case of using one kind of silane monomer represented by formula (I). The present invention also provides polyhedral organosilicon compounds having different organic groups including perfluoroalkyl groups in one molecule as mentioned above and to a method for producing the same;

   (IV)

   (V)

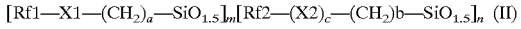   (II)

In the formulas, each of Rf1 and Rf2 represents a perfluoroalkyl group having 1 to 20 carbon atoms, each of X1 and X2 represents a divalent bonding group, each of a and b is 0 or an integer of up to 10, c represents 0 or 1, each of m and n represents an integer of 1 to 19 and m+n is 4 to 20, Y represents a $C_{y1-5}$-alkoxy group or chlorine, and at least one combination selected from the group consisting of Rf1 and Rf2, X1 and X2, and a and b are not the same as each other.

Especially preferred of the organosilicon compounds represented by formula (II) are compounds which are represented by the formula: $(Rf1—CH_2—CH_2—SiO_{1.5})_m(Rf2—CH_2—CH_2—SiO_{1.5})_n$ wherein X1=X2=—$CH_2$— and a=b=c=1 and Rf1 and Rf2 are different from each other. Also preferred are compounds wherein each of X1 and X2 is —CONH— or —$SO_2N(C_3H_7)$—, a=b=3 and c=1.

The synthesis of compounds (II) from compounds (IV) and (V) can be conducted in the same manner as in the above-described synthesis of compounds (I) from compounds (IV). The kinds and amounts of the basic compound used, and the amount of water used may be the same as in the synthesis of compounds (I) from compounds (IV). Incidentally, it is clear that silane monomers used are not limited to two kinds and can be different organosilane monomers comprising more than three different monomers.

Embodiments of polyhedral organo-silicon compounds represented by formula (MIII) are described below.

The silicon compounds represented by formula (III) are compounds which have formula (III) and have a polyhedral structure having perfluoroalkyl groups and reactive functional groups therein;

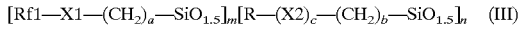   (III)

wherein Rf1 represents a $C_{1-6}$-perfluoroalkyl group, R represents a reactive functional group, each of X1 and X2 represents a divalent bonding group, each of a and b represents 0 or an integer of up to 10, c represents 0 or 1, each of m and n represents an integer of 1 to 19 and m+n is an integer of 4 to 20.

In formula (III), X1 and X2 as bonding groups are, for example, —$CH_2$—, —O—, —$CH_2O$—, —N(R1)—, —S—, —$SO_2N(R1)$—, —COO—, or —CON(R1)—, wherein R1 is hydrogen, or an alkyl group or an alkenyl group each having 1 to 10 carbon atoms.

The reactive functional group R includes, for example, a vinyl group, an acrylic group, a methacrylic group, an epoxy group, an amino group, a mercapto group, an isocyanate group and hydrogen.

The preferred examples of the above-mentioned organosilicon compounds are as follows:

in formula (III), the perfluoroalkyl group has 1 to 8 carbon atoms; the bonding group X1 is —$CH_2$—, —CONH— or —$SO_2N(C_3H_7)$—; a=1 to 5; the reactive functional group R is H—, $CH_2(O)CH$—, $CH_2CHCOO$—, $CH_2C(CH_3)COO$—, $CH_2CH$— or —$NH_2$—; the bonding group X2 is —$CH_2O$—, —$CH_2$— or —$C_3H_6$—; and b=0 to 5 and c=0 or 1.

The following compounds are specific examples of organosilicon compounds having formula (III).

(1) 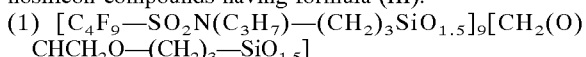

(2) 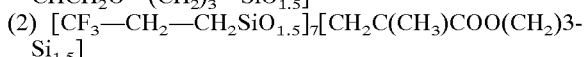

(3) 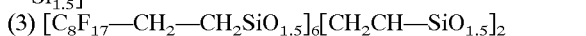

(4) 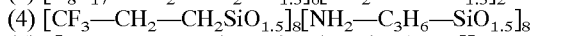

(5) 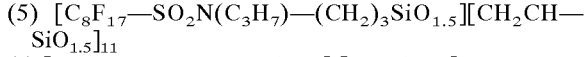

(6) 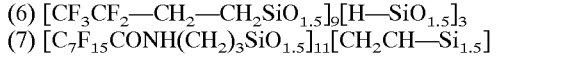

(7) 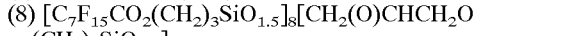

(8) 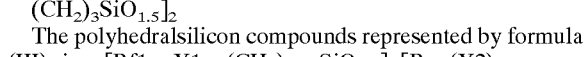

The polyhedralsilicon compounds represented by formula (III), i.e., $[Rf1—X1—(CH_2)a—SiO_{1.5}]_m[R—(X2)_c—(CH_2)_b—SiO_{1.5}]_n$ can be produced by hydrolyzing and condensing two kinds of three-functional group containing silicon compounds as shown in the following general formulas (IV) and (VI) in a solvent in the presence of a basic compound as a catalyst, all in the same manner as in the above-mentioned general formulas (I) and (II):

   (IV)

   (VI)

The compounds are subjected to hydrolysis and condensation in the presence of water and a base In the formulas Y is a $C_{1-5}$-alkoxy group or chlorine, preferably a methoxy group, an ethoxy group or chlorine, and Rf1, R, X1, X2, a, b, c, m and n are as described above.

In the hydrolysis and condensation reactions of the two, three-functional group silicon compounds having formulas (IV) and (VI) in a solvent, using a basic compound as a catalyst, alkoxy groups or chlorine bonded to the silicon atom are cleaved from the molecule and oxygen is substituted therefor with the result that silsesquioxane is formed which has a —$SiO_{1.5}$ group, thereby providing an organosilicon compound having a polyhedral structure having formula (III).

It is conventionally known to polymerize a silane compound in the presence of an acid catalyst. However, with respect to silane compounds having fluoroalkyl groups, generally solubility in an organic solvent greatly decreases as the hydrolysis and condensation proceed as the polymerization reaction proceeds. Consequently, according to the conventional method, it is difficult to proceed with the condensation reaction sufficiently to provide a product having a polyhedral structure, since there is insufficient alkyl substitution and the hydrolysis and condensation reactions proceed slowly.

By contrast, in the method of the present invention, polysiloxane compounds having a polyhedral structure comprising perfluoroalkyl groups which are difficult to be prepare by the conventional method are available from three-functional group silicon compounds as the starting material by conducting the hydrolysis and condensation reactions in the presence of a basic compound as a catalyst in a solvent, preferably using an organic solvent containing at least one atom selected from the group consisting of O, N, F and Cl in the presence of water and the basic compound.

One or more hydroxides or amines can be used as the basic compound for the reaction catalyst. Any metal hydroxide, ammonium hydroxide or quaternary ammonium hydroxide can be used as the hydroxide. Tertiary amines are favored as the amine. The basic compounds M) include alkali metal oxides such as KOH, NaOH and LiOH, alkaline earth metal oxides such as $Ca(OH)_2$ and $Ba(OH)_2$, ammonium hydroxide (ammonia gas is also possible), amines such as trimethylamine, triethylamine, pyridine and lutidine, and quaternary ammonium hydroxides such as tetramethylammonium hydroxide and tetraethylammonium hydroxide. Though acids, especially mineral acids such as hydrochloric acid and nitric acid, are conventionally used as a catalyst for hydrolyzing silane compounds, the reaction which proceeds is limited to a part when using an acid catalyst with the result that polyhedral organosilicon compounds having perfluoroalkyl groups can not be obtained.

The amount of basic compound normally used is $1.0 \times 10^{-5}$ to 2 mol. relative to one mol. of a raw material monomer as shown in formulas (IV), (V) and (VI), preferably $1.0 \times 1.0^{-3}$ to 1 mol. and the amount of water used is 1 to 20 mol., preferably 1.5 to 6 mol. In case of the use of an excessive amount of the basic compound, the polyhedral structure possibly will not form or the reaction mixture may gel. In case of the use of an insufficient amount of the basic compound, the reaction may not proceed sufficiently with the result that the amount of unreacted residue increases.

Water is necessary to hydrolyze the raw material monomer. Three mol. of water is necessary relative to 1 mol. of the raw material monomer for hydrolysis. In case of amount of water used is less than 1 mol., the hydrolysis and condensation do not sufficiently proceed. On the other hand, in the case an excessive amount of water is used, phase separation occurs between the raw material monomer and the solvent with the result that the product compounds desired can not be produced.

The solvent for reaction is preferably an organic solvent containing at least one element selected from the group consisting of O, N, F and Cl. The solvent which is employed is one in which any of the raw material monomer and product polymer dissolve well-therein. The following solvents can be used for satisfying the above-mentioned requirements: alcohols, ketones, ethers, fluorinated and/or chlorinated hydrocarbons, amines and amides. With regard to amine solvent, the solvent concurrently functions as a catalyst and a solvent. A mixed solvent comprising two or more solvents may be used.

The preferred solvents include methanol, ethanol, propanol, isopropanol, acetone, methylketone, cyclohexane, isophorone, diethylether, dioxane, terahydrofuran, trichlorofluoroethane, trichloroethane, triethlylamine, pyridine, lutidine, dimethylformamide and dimethylacetamide, and a mixture thereof.

The hydrolysis and condensation reactions are conducted, for example, by dissolving a silane compound as a raw material monomer in one of the above-mentioned solvents and then dropping an aqueous solution including a basic compound into the resultant solution, or dropping or adding a basic compound and water at the same time or separately. However, the reaction method is not limited to these techniques.

A reaction temperature of 10° C. to 150° C. is suitable, preferably 50° C. to 120° C., so as to increase the yield. With regard to the reaction time, any time in which the hydrolysis and condensation reactions just finish is suitable. A suitable time is usually about 1 to 72 hrs depending on the reaction temperature. The product is obtained in a state where the product is dissolved in a medium comprising an organic solvent and water. In order to isolate the product from the reacted solution, for example, the organic solvent and water are fractionated and the residue is purified by a proper method, for example, by extraction, re-precipitation, distillation or chromatography. Alternatively, the product can be used as a material for forming a film as it is, for example, the product can be used which has only been subjected to a filtration treatment to remove insoluble constituents. Alternatively, a method can be selected wherein water and the basic compound as a catalyst are removed from the reacted solution by a proper method, for example, fractionation, extraction or washing by water, to prepare a solution having the product dissolved in the organic solvent. The product can be preserved in the state of a solution for a long time and can be used as a material for forming a film.

When the above-mentioned polyhedral siloxane compounds are analyzed by $^{29}$Si-NMR and GPC, according to the $^{29}$Si-NMR measurement, only a single peak is exhibited which is attributable to the R—Si(O—Si—)$_3$ group having three siloxane bonds (Si—O—Si bond) relative to one silicon atom. Further, in the GPC obtained, peaks are exhibited which show the degree of polymerization of each compound (constant m and n values). From the results obtained, it can be deduced that the above-mentioned compounds have a cage-polyhedral structure. The m and n values of the polyhedral siloxane compounds, that is, the degrees of polymerization, mainly depend on the coordination of three-functional silicon compounds.

Polyhedral silicon compounds having formula (III) have reactive functional groups and can be used as a so-called reactive monomer. The polymerization of the monomers can be conducted by providing the functional groups mentioned above in a molecule. Consequently, a polymer can be obtained by polymerizing a organosilicon compound represented by formula (II), which possesses excellent film forming properties and the product film exhibits high strength.

Further, various compounds can be prepared by copolymerizing a compound represented by formula (III) with another compound, using the above-mentioned functional groups. Therefore, compounds represented by formula (D) can be used in various fields of application. Further, as the amount of introduced functional groups can be controlled in any way by selecting a mixed proportion of raw materials, a method which employs a crosslinking agent or the like is possible. Furthermore, as polymerization is possible, while maintaining a polyhedral structure (cage structure), the properties thereof can be increased while maintaining the specific qualities of the cage structure.

The polyhedral organosilicon compounds of the present invention are useful for various film-forming materials Since the compounds exhibit excellent solubility in organic solvents, the compounds can be used in the state of a solution and various wet methods for forming a film such as spin coating, dipping and spraying can be easily applied. Furthermore, a dry method for forming a film can be applied, which comprises vacuum deposition using a compound in the state of solid.

Films formed from the polyhedral organosilicon compounds of the present invention have excellent water and oil repellency because of the presence of perfluoroalkyl groups around a polyhedral structure. Further, the films exhibit excellent adhesiveness to various substrate materials as a molecular structure is formed by the siloxane bonds (—Si—O—Si—) in which hydrogen bonding can be introduced, which is different from fluororesins such as polytetrafluoroethylene.

Still further, the films have a high hardness, a high transparency, and an excellent heat resistance and fire resistance, all of which are attributable to the siloxane bond. Therefore, water and oil-repellent films can be formed which have even greater adhesiveness, a higher hardness and an even greater heat resistance than ever. The water and oil-repellent films are useful as a coating material for, for example, glass, fibers and so on.

Since the films have a low refractive index and low dielectric constant in addition to water and oil repellency, the films are useful as films which have a low reflectivity and a film which has a low dielectric constant. The films having a low reflectivity can be used, for example, for surface treatment on the surfaces of TV Braun tubes and various display equipment such as CRTs, liquid crystals, plasmas, and the like, so as to increase image qualities. Films having a low dielectric constant are useful, for example, as an interlayer dielectric film of a semiconductor element.

In addition, since films formed from the polyhedral organosilicon compounds of the present invention vaporize at a specific temperature, the films are suitable for patterning by directively applied heat such as by laser, thereby providing accurate patterning (having a high resolution). Since the films can be dissolved in organic solvents, the films can be removed by etching after patterning, if necessary. Accordingly, the films can be used as, for example, a resist film for micro-working and patterning a semiconductor element.

Having now generally described the invention, a further understanding can be obtained by reference to certain specific Examples which are provided herein for purpose of illustration only and are not intended to be limiting unless otherwise specified.

EXAMPLES

Example 1

Synthesis of $(CF_3CH_2CH_2SiO_{1.5})_8$;

A 21.8 g amount of $[CF_3CH_2CH_2Si(OCH_3)_3]$ and 21.8 g of acetone were placed into a three-necked flask having a volume of 100 cm$^3$ and having a magnetic stirrer, thermometer and dropping funnel and while keeping the resulting solution at 50° C., 6.0 g of a 1 N-NaOH aqueous solution was added dropwise thereto for about thirty minutes. After dropping, the resultant reaction mixture was stirred at the same temperature for 15 hours, thereby completing hydrolysis and condensation reactions. Then, low boiling point materials including a solvent and water were fractionally distilled from the reacted solution under a reduced pressure with the result that a white powder was obtained (85% yield). The white powder was purified by washing by water (80% yield after purification).

Molecular weight distribution of the purified product was measured by GPC using a Shodex KF801+802 column, while tetrahydrofuran was used as the eluent at a flow rate of 0.75 age15 cm$^3$/min. with the result that a line of peak was found at 17.22 minutes. The molecular weight was calculated in terms of polystyrene from the elution time of the peak, the result of which was a molecular weight corresponding to m=8.

The results of an elemental analysis on the product, an IR spectrum (limited to characteristic peaks, the same applies hereinafter) and an $^{29}$Si-NMR spectrum (standard material: TMS, solvent: acetone, the same applies hereinafter ) are as follows. With regard to the $^{29}$Si-NMR spectrum, a strong line peak was found. The position of the peak coincided with the peak of a three group substituted siloxane.

From the above results, the product was identified as $(CF_3CH_2CH_2SiO_{1.5})_8$.

Results of elemental analysis:

|  | C | H | F | Si | O |
| --- | --- | --- | --- | --- | --- |
| Theoretical value: | 24.16 | 2.68 | 38.26 | 18.79 | 16.11 |
| Measured value: | 24.54 | 2.77 | 38.16 | 18.51 | 16.02 |

IR: 2920, 2960, 1130, 1070 cm$^{-1}$
$^{29}$Si-NMR: δ(ppm)=−70.5

The thermal properties of the purified product were investigated by TG-DTA measurement using TG-8110 (from RIGAKU). When a sample of the product was heated in air starting at room temperature at a rate of 10° C./min., a weight loss up to 260° C. was observed up to 5%, which shows that the product has stable thermal properties. When the heating was continued, a sharp weight loss together with a heat absorption was found at about 260° C. The residue, after heating up to 350° C., was up to 5%, which shows that the sample had almost vaporized. Further, with regard to the aluminum pan after the measurement, the external appearance thereof did not show any change from a time before the sample had been charged, nor was any residue or coloring found.

Example 2

Synthesis of $(CF_3CH_2CH_2SiO_{1.5})_{12}$:

A 21.8 g amount of $[CF_3CH_2CH_2Si(OCH_3)_3]$ and 65.4 g of tetrahydrofuran were placed in the same equipment for the reaction of Example 1 and while keeping the resulting solution at 60° C., 3.0 g of a 1 N-KOH aqueous solution was added dropwise thereto for about thirty minutes. After addition, the resultant reaction mixture was stirred at the same temperature for 24 hours, thereby finishing the hydrolysis and condensation reactions. Then, low boiling point materials including a solvent and water were fractionally distilled from the reacted solution under a reduced pressure with the result that a white powder was obtained (84% yield). The white powder was purified by washing by water (75% yield after purification).

The molecular weight distribution of the purified product was measured by GPC in the same manner as in Example 1, with the result that a line peak was found at 16.75 minutes. The molecular weight was calculated in terms of polystyrene from an elution time of the peak, the result of which was a molecular weight corresponding to m=12.

As a result of an elemental analysis on the product, an IR spectrum and $^{29}$Si-NMR to spectrum were as follows: with regard to the $^{29}$Si-NMR spectrum, a line of strong peak was found. The position of the peak coincided with the peak of substitutional siloxane.

From the above-mentioned results, the product was identified as $(CF_3CH_2CH_2SiO_{1.5})_{12}$.

Results of elemental analysis:

|  | C | H | F | Si | O |
|---|---|---|---|---|---|
| Theoretical value: | 24.16 | 2.68 | 38.26 | 18.79 | 16.11 |
| Measured value: | 24.10 | 2.71 | 38.34 | 18.68 | 16.11 |

IR: 2920, 2960, 1130, 1070 cm$^{-1}$ $^{29}$Si-NMR: δ(ppm)=−71.0

Example 3

Synthesis of $(CF_3CH_2CH_2CH_2SiO_{1.5})_{10}$:

A 26.8 g amount of $[CF_3CH_2CH_2CH_2Si(OCH_3)_3]$ and 40g of acetone were placed in the same equipment employed for reaction of Example 1. While keeping the resulting solution at 50° C., a 7.3 g amount of a 1.25 N-NaOH aqueous solution was added dropwise thereto for about thirty minutes. After addition, the resulting reaction mixture was stirred at the same temperature for 24 hours, thereby finishing the hydrolysis and condensation reactions. Then, low boiling point materials including a solvent and water were fractionally distilled from the reacted solution under a reduced pressure with the result that a white powder was obtained (85% yield). The white powder was purified by re-precipitation from water (78% yield after purification).

The molecular weight distribution of the purified product was measured by GPC in the same manner as described in Example 1 with the result that a line peak was found at 16.93 minutes. The molecular weight was calculated in terms of a polystyrene from the elution time of the peak, the result of which was a molecular weight corresponding to m=10.

An elemental analysis, an IR spectrum and an $^{29}$Si-NMR spectrum of the product were conducted. The $^{29}$Si-NMR spectrum showed a strong line peak. The position of the peak coincided with the peak of a three group substituted siloxane.

From the above results, the product was identified as $(CF_3CH_2CH_2CH_2SiO_{1.5})_{10}$.

Results of elemental analysis:

|  | C | H | F | Si | O |
|---|---|---|---|---|---|
| Theoretical value: | 24.1 | 2.0 | 47.7 | 14.1 | 12.1 |
| Measured value: | 24.5 | 2.0 | 45.6 | 14.1 | 13.8 |

IR: 2960, 1130, 1070 cm$^{-1}$ $^{29}$Si-NMR: δ(ppm)=−70.5

The thermal properties of the purified product were investigated in the same manner described in Example 1. When a sample of the product was heated in air starting from room temperature at a rate of 10° C./min. The weight loss up to 275° C. was up to 5%. This magnitude of weight loss indicates a stable thermal property. When the heating was continued, a sharp weight loss together with a heat absorption was found up to 275° C. The amount of residue after heating to 350° C. was up to 5%, which shows that the sample had almost vaporized. Further, with regard to an aluminum pan after the measurement, the external appearance thereof did not show any change from a time before the sample had been charged. Nor were a residue and coloring found.

Example 4

Synthesis of $(C_4F_9CH_2CH_2SiO_{1.5})_{10}$:

A 36.8 g amount of $[C_4F_9CH_2CH_2Si(OCH_3)_3]$ and 220 g of a mixture of acetone and methanol (1/1 wt/wt) were placed into the same equipment employed for reaction of Example 1, except for a three-necked flask having a volume of 500cm$^3$ and while keeping the resulting solution at 50° C., 12 g of a 1 N-NaOH aqueous solution was added dropwise thereto over about thirty minutes. After addition, the resulting reaction mixture was stirred at the same temperature for 24 hours, thereby finishing the hydrolysis and condensation reactions. Then, low boiling point materials including a solvent and water were fractionally distilled from the reacted solution under a reduced pressure with the result that a white powder was obtained (80% yield). The white powder was purified by washing with water (73% yield after purification).

The molecular weight distribution of the purified product was measured by GPC in the same manner described in Example 1 with the result that a line peak was found at 16.37 minutes. The molecular weight was calculated in terms of polystyrene from the elution time of the peak, the result of which was a molecular weight corresponding to m=10.

An elemental analysis, an IR spectrum and $^{29}$Si-NMR spectrum were conducted on the product. A strong line peak was found in the $^{29}$Si-NMR spectrum. The position of the peak coincided with the peak of a three-group substituted siloxane.

From the above-mentioned results, the product was identified as $(C_4F_9CH_2CH_2SiO_{1.5})_{10}$.

Results of elemental analysis:

|  | C | H | F | Si | O |
|---|---|---|---|---|---|
| Theoretical value: | 24.08 | 1.34 | 57.19 | 9.36 | 8.03 |
| Measured value: | 24.01 | 1.37 | 56.89 | 9.41 | 8.32 |

IR: 2920, 2960, 1130, 1070 cm$^{-1}$ $^{29}$Si-NMR: δ(ppm)=−71.2

Example 5

Synthesis of $(C_8F_{17}CH_2CH_2SiO_{1.5})_8$:

A 56.8 g amount of $[C_8F_{17}CH_2CH_2Si(OCH_3)_3]$ and 500 g of 1,1,2-trichloro-2,2,1-trifluoroethane were placed into the same equipment for the reaction of Example 1 except for a three-necked flask having a volume of 1000 cm$^3$. While keeping the resulting the solution at 40° C., a 34 g amount of 10% methanol solution of tetramethylammonium hydroxide and 12 g of water were added dropwise thereto for about thirty minutes. After addition, the resulting reaction mixture was stirred at the same temperature for 3 hours, thereby finishing the hydrolysis and condensation reactions. Then, low boiling point materials including a solvent and water were fractionally distilled from the reaction solution under a reduced pressure and the resultant viscous liquid was purified by washing with water (76% yield after purification).

The molecular weight distribution of the purified product was measured by GPC in the same manner described in Example 1 with the result that a line peak was found at 16.03 minutes. The molecular weight was calculated in terms of polystyrene from the elution time of the peak, the result of which was a molecular weight corresponding to m=8.

Elemental analysis, an IR spectrum and $^{29}$Si-NMR spectrum were conducted on the product. A strong line peak was found in the $^{29}$Si-NMR spectrum. The position of the peak coincided with the peak of a three-group substituted siloxane.

From the above-mentioned results, the product was identified as $(C_8F_{17}CH_2CH_2SiO_{1.5})_8$.

Results of elemental analysis:

|  | C | H | F | Si | O |
|---|---|---|---|---|---|
| Theoretical value: | 24.02 | 0.80 | 64.73 | 5.61 | 4.81 |
| Measured value: | 24.01 | 0.82 | 65.13 | 5.53 | 4.51 |

IR: 2920,2960, 1130,1070 cm$^{-1}$ $^{29}$Si-NMR: δ(ppm)=−71.5

Example 6

Synthesis of $(C_7F_{15}CONH(CH_2)_3SiO_{1.5})_{12}$:

A 59.0 g amount of $[C_7F_{15}CONH(CH_2)_3Si(Cl)_3]$ and 181.5 g of 1,4-dioxane were placed in the same equipment for the reaction described in Example 4, and then 1.0 g of triethylamine and 20.0 g of water were placed therein, followed by stirring at 100° C. for 12 hours, thereby finishing the hydrolysis and condensation reactions. Then, low boiling point materials including a solvent and water were fractionally distilled from the reaction solution under a reduced pressure. The residue was washed with water. Subsequently, the washed residue was placed in hexane to separate and remove insoluble constituents, thereby purifying this material (74% yield after purification).

The molecular weight distribution of the purified product was measured by GPC in the same manner described in Example 1 and the molecular weight was calculated in terms of polystyrene, the result of which showed that the calculated molecular weight corresponded to that of the above-mentioned compound.

An elemental analysis, an IR spectrum and $^{29}$Si-NMR spectrum were conducted on the product. The $^{29}$Si-NMR spectrum showed a strong line peak. The position of the peak coincided with the peak of a three-substitutional siloxane.

From the above-mentioned results, the product was identified as $(C_7F_{15}CONH(CH_2)_3SiO_{1.5})_{12}$.

Results of elemental analysis:

|  | C | H | F | N | Si | O |
|---|---|---|---|---|---|---|
| Theoretical value: | 26.09 | 1.38 | 56.32 | 2.77 | 5.53 | 7.91 |
| Measured value: | 26.11 | 1.35 | 56.18 | 2.68 | 5.53 | 8.15 |

IR: 2920, 2960, 1720,1130, 1070 cm$^{-1}$ $^{29}$Si-NMR: δ(ppm)=−71.4

Example 7

Synthesis of $(C_8F_{17}SO_2N(C_3H_7)(CH_2)_3SiO_{1.5})_{10}$:

A 74.5 g amount of $[C_8F_{17}SO_2N(C_3H_7)(CH_2)_3Si(OC_2H_5)_3]$ and 670 g acetone were placed into the same equipment for reaction described in Example 5. While keeping the resulting solution at 50° C., a 5.5 g amount of a 10% methanol solution of tetramethylammonium hydroxide and 3.0 g of water were added dropwise thereto over about thirty minutes. After addition, the resulting reaction mixture was stirred at the same temperature for 24 hours, thereby finishing the hydrolysis and condensation reactions. Then, low boiling point materials including a solvent and water were fractionally distilled from the reaction solution under a reduced pressure. The residue was washed by water, thereby purifying the residue (67% yield after purification).

The molecular weight distribution of the purified product was measured by GPC in the same manner described in Example 1 and the molecular weight was calculated in terms of polystyrene, the result of which showed that the calculated molecular weight corresponded to that of the above-mentioned compound.

An elemental analysis, an IR spectrum and an $^{29}$Si-NMR spectrum on the product were conducted. A strong line peak was found in the $^{29}$Si-NMR spectrum. The position of the peak coincided with the peak of a three-group substituted siloxane.

From the above-mentioned results, the product was identified as $(C_8F_{17}SO_2N(C_3H_7)(CH_2)_3SiO_{1.5})_{10}$.

Results of elemental analysis:

|  | C | H | F | N | S | Si | O |
|---|---|---|---|---|---|---|---|
| Theoretical value: | 26.50 | 2.05 | 50.95 | 2.21 | 5.05 | 4.41 | 8.83 |
| Measured value: | 26.45 | 1.97 | 51.08 | 2.20 | 5.03 | 4.39 | 8.88 |

IR: 2920, 2960, 1400, 1130, 1070 cm$^{-1}$ $^{29}$Si-NMR: δ(ppm)=−70.9

Example 8

Synthesis of $(CF_3CH_2CH_2SiO_{1.5})_4$;

A 21.8 g amount of $[CF_3CH_2CH_2Si(OCH_3)_3]$ and 10.9 g of 2-butanone were placed in the same equipment for the reaction described in Example 1, and while keeping the resulting solution at 60° C., a 6.0 g amount of a 1 N-KOH aqueous solution was added dropwise thereto, followed by stirring for 24 hours, thereby finishing the hydrolysis and condensation reactions. Thereafter, a solvent and low boiling point materials and water were fractionally distilled from the reaction solution under a reduced pressure with the result that a white powder was obtained (65% yield). The white powder was purified by re-precipitation.

The molecular weight distribution of the purified product was measured by GPC in the same manner described in Example 1 with the result that a line peak was found. The molecular weight was calculated in terms of polystyrene from the elution time of the peak, the result of which was a molecular weight corresponding to m=4.

An elemental analysis, an IR spectrum and an $^{29}$Si-NMR spectrum were conducted on the product. A strong line peak was found in the $^{29}$Si-NMR spectrum. The position of the peak coincided with the peak of a three-group substituted siloxane.

From the results above, the product was identified as $(CF_3CH_2CH_2SiO_{1.5})_4$.

Results of elemental analysis:

|  | C | H | F | Si | O |
| --- | --- | --- | --- | --- | --- |
| Theoretical value: | 24.16 | 2.68 | 38.26 | 18.79 | 16.11 |
| Measured value: | 24.25 | 2.78 | 38.27 | 18.75 | 16.31 |

IR: 2920, 2960, 1130, 1070 cm$^{-1}$ $^{29}$Si-NMR: δ(ppm)=−71.1

Example 9

Synthesis of $(CF_3CH_2CH_2SiO_{1.5})_7(C_8F_{17}CH_2CH_2SiO_{1.5})$:

A 18.7 g amount of $[CF_3CH_2CH_2Si(OCH_3)_3]$, 8.1 g of $[C_8F_{17}CH_2CH_2Si(OCH_3)_3]$ and 27 g of tetrahydrofuran as a solvent were placed into the same equipment for the reaction described in Example 1. While keeping the resulting solution at 50° C., 8.0 g of a 1 N-NaOH aqueous solution was added dropwise thereto over about thirty minutes. After addition, the resulting reaction mixture was stirred at the same temperature for 15 hours, thereby finishing the hydrolysis and condensation reactions. Then, low boiling point materials including a solvent and water were fractionally distilled from the reacted solution under a reduced pressure with the result that a white powder was obtained (85% yield). The white powder was purified by re-precipitation from water.

The molecular weight distribution of the purified product was measured by GPC in the same manner described in Example 1 with the result that a line was found at 17.09 minutes. The molecular weight was calculated in terms of polystyrene from the elution time of the peak, the result of which showed that the calculated molecular weight corresponded to that of the above-mentioned compound.

An elemental analysis, an IR spectrum and an $^{29}$Si-NMR spectrum were conducted on the product. A strong line peak was found in the $^{29}$Si-NMR spectrum. The position of the peak coincided with the peak of a three-group substituted siloxane.

From the above-mentioned results, the product was identified as $(CF_3CH_2CH_2SiO_{1.5})_7(C_8F_{17}CH_2CH_2SiO_{1.5})$.

Results of elemental analysis:

|  | C | H | F | Si | O |
| --- | --- | --- | --- | --- | --- |
| Theoretical value: | 24.1 | 2.1 | 46.8 | 14.5 | 12.5 |
| Measured value: | 24.5 | 2.3 | 46.2 | 15.1 | 11.9 |

IR: 2920, 2960, 1130, 1070 cm$^{-1}$ $^{29}$Si-NMR: δ(ppm)=−69.75

The thermal properties of the purified product were investigated in the same manner described in Example 1. When a sample of the product was heated in air starting at room temperature at a rate of 10°C./min., the weight loss up to 270° C. was up to 5%, thereby indicating a stable thermal property. When the heating up was continued, a sharp weight loss together with a heat absorption was found up to 270° C. The amount of residue after heating up to 400° C. was up to 5%, which showed that the sample had almost vaporized. Further, with regard to an aluminum pan after the measurement, the external appearance thereof did not show any change from a time before the sample had been charged. Further, no residue and coloring were found.

Example 10

Synthesis of $(CF_3CH_2CH_2SiO_{1.5})_8[C_4F_9SO_2N(C_3H_7)(CH_2)_3SiO_{1.5}]_2$;

A 21.8 g amount of (0.1 mol.) of $[CF_3CH_2CH_2Si(OCH_3)_3]$, 12.6 g (0.025 mol.) of $[C_4F_9SO_2N(C_3H_7)(CH_2)_3Si(OCH_3)_3]$ and 103 g of trichlorotrifluoroethane placed into the same equipment for the reaction described in Example 4 and while keeping the resulted solution at 30° C., 6.0 g of a 10% methanol aqueous solution of tetramethylammonium hydroxide and 7 g of water were added dropwise thereto for about thirty minutes. After addition, the resulting reaction mixture was stirred at the same temperature for 24 hours, thereby finishing the hydrolysis and condensation reactions. Then, low boiling point materials including a solvent and water were fractionally distilled from the reacted solution under a reduced pressure with the result that a white powder was obtained (77% yield). The white powder was purified by re-precipitation from water (78% yield after purification).

A molecular weight distribution of the purified product was measured by GPC in the same manner described in Example 1 and the molecular weight was calculated in terms of polystyrene, the result of which showed that the calculated molecular weight corresponded to that of the above-mentioned compound.

An elemental analysis, an IR spectrum and an $^{29}$Si-NMR spectrum were conducted on the product. A strong line peak was found in the $^{29}$Si-NMR spectrum. The position of the peak coincided with the peak of a three-substitutional siloxane.

From the above-mentioned results, the product was identified as $(CF_3CH_2CH_2SiO_{1.5})_8[C_4F_9SO_2N(C_3H_7)(CH_2)_3SiO_{1.5}]_2$.

Results of elemental analysis:

|  | C | H | F | N | S | Si | O |
|---|---|---|---|---|---|---|---|
| Theoretical value: | 25.6 | 2.8 | 38.7 | 1.4 | 3.2 | 14.0 | 14.5 |
| Measured value: | 24.9 | 2.8 | 38.3 | 1.5 | 3.4 | 13.6 | 15.5 |

IR: 2920, 2960, 1400, 1130, 1070 cm$^{-1}$
$^{29}$Si-NMR: δ(ppm)=−69.5

Example 11

Synthesis of $(C_4F_9SO_2N(C_3H_7)(CH_2)_3SiO_{1.5})_7$ $(C_8F_{17}CH_2CH_2SiO_{1.5})$ A 50.3 g amount of $[C_4F_9SO_2N(C_3H_7)(CH_2)_3Si(OCH_3)_3]$, 10 g of $[C_8F_{17}CH_2CH_2Si(OCH_3)_3]$ and 120 g of acetone as a solvent were placed in the same equipment for the reaction described in Example 4 and while keeping the resulted solution at 50° C., 8.0 g of a about 0.5 N-KOH aqueous solution was added dropwise thereto for about thirty minutes. After addition, the resulting reaction mixture was stirred at the same temperature for 24 hours, thereby finishing the hydrolysis and condensation reactions. Then, low boiling point materials including a solvent and water were fractionally distilled from the reacted solution under a reduced pressure with the result that a white powder was obtained (72% yield). The white powder was purified by re-precipitation from water.

The molecular weight distribution of the purified product was measured by GPC in the same manner described in Example 1 and the molecular weight was calculated in terms of polystyrene, the result of which showed that the calculated molecular weight corresponded to that of the above-mentioned compound.

An elemental analysis, an IR spectrum and an $^{29}$Si-NMR spectrum were conducted on the product. A strong line peak was found in the $^{29}$Si-NMR spectrum. The position of the peak coincided with the peak of a substituted siloxane.

From the above-mentioned results, the product was identified as $(C_4F_9SO_2N(C_3H_7)(CH_2)_3SiO_{1.5})_7(C_8F_{17}CH_2CH_2SiO_{1.5})$.

Results of elemental analysis:

|  | C | H | F | N | S | Si | O |
|---|---|---|---|---|---|---|---|
| Theoretical value: | 27.1 | 2.7 | 43.0 | 2.8 | 6.3 | 6.3 | 11.8 |
| Measured value: | 26.9 | 2.8 | 43.3 | 2.5 | 6.3 | 6.4 | 11.8 |

IR: 2920, 2960, 1400, 1130, 1070 cm$^{-1}$
$^{29}$Si-NMR: δ(ppm)=−69.7

Comparative Example 1

A 21.8 g of $[CF_3CH_2CH_2Si(OCH_3)_3]$ and 21.8 g of acetone were placed into the same equipment for the reaction described in Example 1 and while keeping the resulting solution at 50° C., 1.0 g of a 0.2 N-HCl aqueous solution was added dropwise thereto for about 30 minutes. After addition, the resulted reaction mixture was stirred at the same temperature for 15 hours, thereby finishing the hydrolysis and condensation reactions. Then, low boiling point materials including a solvent and water were fractionally distilled from the reacted solution under a reduced pressure with the result that a oil-like material having a light-yellow color and a high viscosity was obtained (81% yield).

The molecular weight distribution of the product was measured by GPC in the same manner described in Example 1 with the result that a plurality of peaks including a monomer peak were found. An elemental analysis, an IR spectrum and an $^{29}$Si-NMR spectrum were conducted on the product. A strong line peak was found in the $^{29}$Si-NMR spectrum. The positions of the peaks coincided with the peaks of monomer and one-substituted and two-substituted siloxanes.

Results of elemental analysis:

|  | C | H | F | Si | O |
|---|---|---|---|---|---|
| Theoretical value: | 24.16 | 2.68 | 38.26 | 18.79 | 16.11 |
| Measured value: | 29.89 | 4.80 | 30.43 | 14.95 | 19.93 |

IR: 3400, 2920, 2960, 2840, 1130, 1070 cm$^{-1}$
$^{29}$Si-NMR: δ(ppm)=−45.5, −53.0,61.5−

The thermal properties of the purified product were investigated by the TG-DTA in the same manner described in Example 1. When a sample of the product was heated in air starting at room temperature at a rate of 10° C./min., the weight losses were found by steps at 220° C. and 275° C. and the residue was 65% at 350° C. The residue in an amount of more than 40% was found even when heating up was further continued up to 400° C. The residue became black in an aluminum pan.

From the above results, in the case where an acid catalyst is not used, it is found that any organosilicone compound having a cage polyhedral structure of the present invention is not present.

Comparative Example 2

A 21.8 g amount of $[CF_3CH_2CH_2Si(OCH_3)_3]$ and 21.8 g of acetone were placed into the same equipment for reaction described in Example 1 and while keeping the resulting solution at 50° C., 1.0 g of a 0.01 N-NaOH aqueous solution was added dropwise thereto. After addition, the resulting reaction mixture was stirred at the same temperature for 24 hours, thereby finishing the hydrolysis and condensation reactions. Then, low boiling point materials including a solvent and water were fractionally distilled from the reaction solution under a reduced pressure with the result that an oil-like material which is colorless-transparent and has a high viscosity was obtained (82% yield).

The molecular weight distribution of the product was measured by GPC in the same manner described in Example 1 with the result that a plurality of peaks including a monomer peak were found. In the Comparative Example, no organosilicone compound having a cage polyhedral structure of the present invention was found, since the amount of water used was too little.

Comparative Example 3

A 21.8 g amount of $[CF_3CH_2CH_2Si(OCH_3)_3]$ was placed in the same equipment for the reaction described in Example 1 and while keeping the resulting solution at 50° C., 6.0 g of a 1 N-NaOH aqueous solution was added dropwise thereto and then 34 g of water was added dropwise. During the addition of water, a white precipitate formed. In comparative Example 3, no organosilicone compound having a cage-polyhedral structure of the present invention could be obtained, since the amount of water used was excessive.

Example 12

The reacted solution obtained in Example 1 was filtered with a membrane filter having a pore size of 0.2 μm to remove insoluble constituents. The filtered solution was coated on a silicon substrate at a rotation speed of 4500 rpm with a spin coater which could prevent solvent from vaporizing. Then, the coated film was dried by heating at 150° C. for 30 minutes, thereby forming a film which comprised polysiloxane having perfluoroalkyl groups.

The film thickness after drying was measured with a scanning electron microscope, the result of which was 0.3 $\mu$m. The film obtained was colorless-transparent and was a smooth plane having no holes and projections. A circular electrode having a diameter of 2 mm was formed on the film by gold deposition and the capacitance of a part which was sandwiched in between the gold electrode and the silicon substrate was measured with an LCR meter (from Nippon Hewlett-Packard:4284A) A dielectric constant of 2.9 was found.

Example 13

A film having a thickness of 0.2 $\mu$m was formed by conducting vacuum evaporation on a silicon substrate, using the white powder obtained in Example 1, under the condition of $0.5 \times 10^{-3}$Pa with a small vacuum evaporation device LUMINO (from Nippon Shinku). The dielectric constant of the film was measured in the same manner described in Example 12, the result of which was 2.75.

Comparative Example 4

A silicon substrate was heated at 900° C. in an electric furnace and 5l/min. of saturated steam was introduce therein. An oxide film of $SiO_2$ was formed on the silicon substrate. The thickness of the film was 0.3 $\mu$m. The dielectric constant of the film was measured in the same manner described in Example 12, the result of which was 3.7.

Comparative Example 5

A 50 g amount of propyltrimethoxysilane and 50 g of acetone were placed into the same equipment for the reaction described in Example 1 and while keeping the resulted solution at 50° C., 6.0 g of a 1 N-NaOH aqueous solution was added dropwise thereto for about thirty minutes. After addition, the resulting reaction mixture was stirred for 15 hours, thereby finishing the hydrolysis and condensation reactions. Then, a film was formed using the reacted solution by a spin coat method and the dielectric constant of the formed film was measured, both in the manner described in Example 12. The dielectric constant measured was 3.5.

Since the film having perfluoromethyl groups formed in Example 12 exhibited a dielectric constant of 2.9, it is clear that the dielectric constant of a film is lowered by introducing perfluoromethyl groups thereto.

Example 14

The reaction solution obtained in Example 4 was filtered with a membrane filter having a pore size of 0.2 $\mu$m to remove insoluble constituents. The filtered solution was coated on a glass substrate at a rotation speed of 4500 rpm with spin coater which could prevent solvent from vaporizing. Then, the coated film was dried by heating at 200° C. for 30 minutes, thereby forming a film which comprised polysiloxane having perfluoroalkyl groups.

In order to measure the contact angle of the film to water, a waterdrop having a volume of about 2 $\mu$l was formed at room temperature in the needle point of a microcylinder and the waterdrop was dropped on the coated film face. The contact angle of the film surface to water was measured using a contact angle-measurement equipment, the result of which was 101.

In addition, the reflectivity of the coated face was measured as follows. After sticking a piece of black tape to the back face of the glass substrate (the face opposite the coated face) so as to prevent reflection from the back face, the reflectivity of the coated film face was measured in the range of a wavelength of 240 to 800 mm with reflectivity measurement equipment. The result was 1.3%.

Comparative Example 6

A 10% methanol solution containing a hydrolyzate of tetraethoxysilane was filtered with a membrane filter having a pore size of 0.2 $\mu$m to remove insoluble constituents. The filtered solution was coated on a glass substrate and the coated film was dried, both in the same manner described in Example 14, thereby forming a film of $SiO_2$.

The contact angle of the film to water and the reflectivity of the film were measured in the same manner as described in Example 14, the results of which showed that the contact angle was 25 ° C. and the reflectivity was 4%.

Example 15

A black ink was dropped into the reaction solution obtained in Example 1, followed by sufficient mixing, thereby coloring the solution. The colored solution was filtered with a membrane having a pore size of 0.2 $\mu$m to remove insoluble constituents. A glass substrate was dipped into the colored solution and then the glass substrate was drawn up at a constant speed of 2 mm/min. to conduct coating. The coated substrate was heated at 150° C. for thirty minutes to dry the film. The external appearance of the dried film, upon visual inspection, showed a smooth black film having no holes and projections.

A black film was irradiated with a YAG laser having a wavelength of 532 nm and a power of 180 mJ for one second, 5 seconds, 10 seconds and 20 seconds, and the conditions of the surface were observed after each irradiation. The diameter of beams was 1 cm in all radiation experiments. In case of one second irradiation, only a portion of the film was burned by the irradiating beams, and the glass face was exposed in the corresponding portion. In the case of 20 seconds irradiation, the result was the same. In the portion burned down by the laser beams, no scorching and denaturation were found.

Comparative Example 7

A 10 g amount of polyacrylic acid was dissolved in 30 g of methanol and a black ink was dropped into the solution obtained, followed by sufficient mixing, thereby coloring the solution. The colored solution was filtered with a membrane filter having a pore size of 0.2 $\mu$m to remove insoluble constituents. A glass substrate was dipped into the colored solution and then the glass substrate was drawn up at a constant speed of 2 mm/min., thereby conducting coating. The coated substrate was heated at 150° C. for thirty minutes to dry the film. On visual inspection, the external appearance of the dried film showed a smooth black film having no holes and projections.

A polyacrylic acid film was irradiated with a YAG laser having a wavelength of 532 nm and a power of 180 mJ in the same manner described in Example 15, and the conditions of the surface were observed. The portion of the film exposed to laser irradiation on the glass substrate had degenerated and scorched.

Comparative Example 8

A 50 g amount of $[CF_3CH_2CH_2Si(OCH_3)_3]$ and 50 g of tetrahydrofuran were placed into the same equipment used for the reaction as described in Example 1 and while keeping the resulting solution at 50° C., 6.0 g of a 0.2 N-HCl aqueous solution was added dropwise thereto for about thirty minutes. After addition, the resulting reaction mixture was stirred at the same temperature for 15 hours, thereby finishing the hydrolysis and condensation reactions.

A black ink was dropped into the obtained reaction solution, followed by sufficient mixing, thereby coloring the solution. The colored solution was filtered with a membrane filter having a pore size of 0.2 μm to remove insoluble constituents. A glass substrate was dipped in the colored solution and then the glass substrate was drawn up at a constant speed of 10 mm/min., thereby coating the substrate. The coated substrate was heated at 150° C. for thirty minutes to dry the film. Upon visual inspection, the external appearance of the dried film showed a smooth black film having no holes and projections.

A polysiloxane film having perfluoroalkyl groups was irradiated with YAG laser beams having a wavelength of 532 nm and a power of 180 mJ in the same manner described in Example 15, and the conditions of the surface were observed. The portion of the film on the glass substrate irradiated with beams of laser irradiation had degenerated and had been scorched (somewhat black).

Example 16

Synthesis of $[C_4F_9SO_2N(C_3H_7)(CH_2)_3SiO_{1.5}]_9[CH_2(O)CHCH_2O(CH_2)_3SiO_{1.5}]$:

A 51.6 g amount of $[C_4F_9SO_2N(C_3H_7)(CH_2)_3SiCl_3]$, 2.6 g of $CH_2(O)CHCH_2O(CH_2)Si(OCH_3)$ and 250 g of acetone as a solvent were placed into the same equipment used for the reaction as described in Example 5 and while keeping the resulted solution at 50° C., 18.3 g of a 1 N-NaOH aqueous solution was added dropwise thereto. After addition, the resulting reaction mixture was stirred for 15 hours, thereby finishing the hydrolysis and condensation reactions. Then, the solvent and low boiling point materials were fractionally distilled from the reaction solution under a reduced pressure with the result that a white powder was obtained (79% yield). The white powder was purified by re-precipitation from water.

The molecular weight distribution of the purified product was measured by GPC in the same manner described in Example 1 with the result that a line peak was found at 16.26 min. The molecular weight was calculated in terms of polystyrene from the elution time of the peak, the result of which showed that the calculated molecular weight corresponded to that of the above-mentioned compound.

An elemental analysis, an IR spectrum and an $^{29}$Si-NMR spectrum were conducted on the product. A strong line peak was found in the $^{29}$Si-NMR spectrum. The position of the peak coincided with the peak of a three-group substituted siloxane.

From the results shown above, the compound obtained was identified as $[C_4F_9SO_2N(C_3H_7)(CH_2)_3\ SiO_{1.5}]_9[CH_2(O)CHCH_2O(CH_2)_3SiO_{1.5}]$.

The thermal properties (TG-DTA) of the purified product were measured. When a sample of the product was heated in air starting at room temperature at a rate of 10° C./min., a weight loss up to 300° C. was up to 5%, thereby exhibiting stable thermal properties. As the heating was continued, a sharp weight loss together with a heat absorption was found up to 300° C. The residue after heating up to 450° C. was up to 5%, which showed that the sample had almost vaporized. Further, with regard to the aluminum pan after the measurement, the external appearance thereof did not show any change from the time before the sample had been charged. No residue and coloring were found.

Results of elemental analysis

|  | C | H | F | N | S | Si | O |
|---|---|---|---|---|---|---|---|
| Theoretical value: | 28.3 | 3.1 | 37.8 | 3.1 | 7.1 | 6.9 | 13.7 |
| Measured value: | 28.5 | 3.0 | 37.3 | 3.5 | 7.3 | 6.2 | 14.2 |

IR: 2920, 2960, 1400, 1130, 1070 cm$^{-1}$ $^{29}$Si-NMR: δ(ppm)=−69.5

Example 17

Synthesis of $[CF_3CH_2CH_2SiO_{1.5}]_7[CH_2C(CH_3)COO(CH_2)_3SiO_{1.5}]$:

A 21.8 g amount of $[CF_3CH_2CH_2Si(OCH3)]$, 3.5 g of $CH_2C(CH_3)COO(CH2)Si(OCH_3)_3$ and 25 g of acetone as a solvent were placed in the same equipment employed for the reaction described in Example 5 and while keeping the resulted solution at 30° C., 3.1 g of a 0.1 N-KOH aqueous solution was added dropwise thereto. After addition, the resulting reaction mixture was stirred for 24 hours, thereby finishing the hydrolysis and condensation reactions. Then, low boiling point materials were fractionally distilled from the reaction solution under a reduced pressure with the result that a white powder was obtained (70% yield). The white powder was purified by re-precipitation from water.

The molecular weight distribution of the purified product was measured by GPC in the same manner described in Example 5 with the result that a line peak was found. The molecular weight was calculated in terms of polystyrene from the elution time of the peak, the result of which showed that the calculated molecular weight corresponded to that of the above-mentioned compound.

An elemental analysis, an IR spectrum and an $^{29}$Si-NMR spectrum were conducted on the compound. A strong line peak was found in the $^{29}$Si-NMR spectrum. The position of the peak coincided with the peak of a three-group substituted siloxane.

From the above-mentioned results, the compound obtained was identified as $[CF_3CH_2CH_2SiO_{1.5}]_7[CH_2C(CH_3)COO(CH_2)_3SiO_{1.5}]$.

Results of elemental analysis

|  | C | H | F | Si | O |
|---|---|---|---|---|---|
| Theoretical value: | 28.0 | 1.3 | 33.3 | 18.7 | 18.7 |
| Measured value: | 28.3 | 1.3 | 33.4 | 18.4 | 19.4 |

IR: 2920, 2960, 1720, 1130, 1070 cm$^{-1}$ $^{29}$Si-NMR: δ(ppm)=−69.6

Example 18

Synthesis of $[C_8F_{17}CH_2CH_2SiO_{1.5}]_6[CH_2CHSiO_{1.5}]_2$:

A 28.4 g amount of $C_8F_{17}CH_2CH_2Si(OCH_3)_3$, 2.5 g of $CH_2CH_2Si(OCH_3)_3$ trichlorotrifluoroethane as a solvent were placed into the same equipment used for the reaction described in Example 5 and while keeping the resulted solution at 30° C., 5.2 g of a 10% methanol aqueous solution of tetrahydroammonium hydroxide and 4 g of water were added dropwise thereto. After addition, the resulting reaction mixture was stirred for 24 hours, thereby finishing the hydrolysis and condensation reactions. Then, the solvent and low boiling point materials were fractionally distilled from the reacted solution under a reduced pressure with the result that a white powder was obtained (72% yield). The white powder was purified by re-precipitation.

The molecular weight distribution of the purified product was measured by GPC in the same manner described in Example 1 and the molecular weight was calculated in terms of polystyrene from the elution time of the peak, the result of which showed that the calculated molecular weight corresponded to that of the above-mentioned compound.

An elemental analysis, an IR spectrum and an $^{29}$Si-NMR spectrum were conducted on the compound. A strong line peak was found in the $^{29}$Si-NMR spectrum. The position of the peak coincided with the peak of a three-group substituted siloxane.

From the above-mentioned results, the compound obtained was identified as $[C_8F_{17}CH_2CH_2SiO_{1.5}]_6$ $[CH_2CHSiO_{1.5}]_2$.

Results of elemental analysis

|  | C | H | F | Si | O |
|---|---|---|---|---|---|
| Theoretical value: | 20.8 | 1.0 | 64.4 | 7.4 | 6.4 |
| Measured value: | 20.2 | 1.1 | 64.3 | 7.5 | 6.9 |

IR: 2920, 2960, 1130, 1070 cm$^{-1}$ $^{29}$Si-NMR: δ(ppm)=−69.7

Example 19

Synthesis of $[CF_3CH_2CH_2SiO_{1.5}]_8[H_2NC_3H_6SiO_{1.5}]_8$:

10.9 g amount of $CF_3CH_2CH_2Si(OCH_3)_3$, 11.1 g of $H_2NC_3H_6Si(OC_2H_5)_3$ and 154 g of 1,4-dioxane as a solvent were placed in the same equipment for the reaction described in Example 5 and while keeping the resulting solution at 90° C., 8.5 g of a 1 N-KOH aqueous solution was added dropwise thereto. After addition, the resulting reaction mixture was stirred for 6 hours, thereby finishing the hydrolysis and condensation reactions. Then, the solvent and low boiling point materials were fractionally distilled from the reaction solution under a reduced pressure with the result that a white powder was obtained (55% yield). The white powder was purified by re-precipitation.

The molecular weight distribution of the purified product was measured by GPC in the same manner described in Example 1 and the molecular weight was calculated in terms of polystyrene from the elution time of the peak, the result of which showed that the calculated molecular weight corresponded to that of the above-mentioned compound. An elemental analysis, an IR spectrum and an $^{29}$Si-NMR spectrum were conducted on the compound. A strong line peak was found in the $^{29}$Si-NMR spectrum. The position of the peak coincided with the peak of a three-substitutional siloxane.

From the above-mentioned results, the compound obtained was identified as $[CF_3CH_2CH_2SiO_{1.5}]_8[H_2NC_3H_6SiO_{1.5}]_8$.

Results of elemental analysis

|  | C | H | F | N | Si | O |
|---|---|---|---|---|---|---|
| Theoretical value: | 27.8 | 4.6 | 22.0 | 5.4 | 21.6 | 18.5 |
| Measured value: | 28.0 | 4.3 | 21.3 | 4.9 | 21.4 | 20.1 |

IR: 2920, 2960, 1425, 1130, 1070 cm$^{-1}$ $^{29}$Si-NMR: δ(ppm)=−70.6

Example 20

Synthesis of $[C_8F_{17}SO_2N(C_3H_7)(CH_2)_3SiO_{1.5}]$ $[CH_2CHSiO_{1.5}]_{11}$:

A 7.5 g amount of $C_8F_{17}SO_2N(C_3H_7)(CH_2)Si(OC_2H_5)$, 16.3 g of $CH_2CHSi(OCH_3)_3$ and 215 g of tetrahydrofuran as a solvent were placed into the same equipment employed for reaction described in Example 5 and while keeping the resulting solution at 30° C., 6.5 g of a 0.1 N-NaOH aqueous solution was added dropwise thereto. After addition, the resulting reaction mixture was stirred for 6 hours, thereby finishing the hydrolysis and condensation reactions. Then, the solvent and low boiling point materials were fractionally distilled from the reaction solution under a reduced pressure with the result that a white powder was obtained (55% yield). The white powder was purified by re-precipitation.

The molecular weight distribution of the purified product was measured by GPC in the same manner described in Example 1 and the molecular weight was calculated in terms of polystyrene from the elution time of a peak, the result of which showed that the calculated molecular weight corresponded to that of the above-mentioned compound.

An elemental analysis, an IR spectrum and an 29Si-NMR spectrum were conducted on the compound. A strong line peak was found in the 29Si-NMR spectrum. The position of the peak coincided with the peak of a three-substitutional siloxane.

From the above-mentioned results, the product was identified as $[C_8F_{17}SO_2N(C_3H_7)(CH_2)_3SiO_{1.5}][CH_2CH\ SiO_{1.5}]_{11}$.

Results of elemental analysis

|  | C | H | F | N | S | Si | O |
|---|---|---|---|---|---|---|---|
| Theoretical value: | 28.7 | 3.1 | 21.5 | 0.9 | 2.1 | 22.4 | 21.3 |
| Measured value: | 28.9 | 3.0 | 20.7 | 0.5 | 2.3 | 22.2 | 22.4 |

IR: 2920, 2960, 1400, 1130, 1070 cm$^{-1}$ $^{29}$Si-NMR: δ(ppm)=−70.6

Example 21

Synthesis of $[CF_3CF_2—CH2—CH_2SiO_{1.5}]_9[H—SiO_{1.5}]_3$:

A 13.4 g amount of $CF_3CF_2CH_2CH_2Si(OCH_3)_3$, 2.0 g of $HSi(OCH_3)_3$ and 30 g of acetone as a solvent were placed into the same equipment employed for the reaction described in Example 5 and while keeping the resulting solution at 30° C., 3.5 g of a 0.1 N-NaOH aqueous solution was added dropwise thereto for thirty minutes. After addition, the resulting reaction mixture was stirred for 24 hours, thereby finishing the hydrolysis and condensation reactions. Then, the solvent and low boiling point materials were fractionally distilled from the reaction solution under a reduced pressure with the result that a white powder was obtained (71% yield). The white powder was purified by re-precipitation.

The molecular weight distribution of the purified product was measured by GPC in the same manner described in Example 1 and the molecular weight was calculated in terms of polystyrene from the elution time of a peak, the result of which showed that the calculated molecular weight corresponded to that of the above-mentioned compound.

An elemental analysis, an IR spectrum and an $^{29}$Si-NMR spectrum were conducted on the compound. A strong line peak was found in the $^{29}$Si-NMR spectrum. The position of the peak coincided with the peak of a three-substitutional siloxane.

From the above-mentioned results, the product was identified as $[CF_3CF_2-CH2-CH_2SiO_{1.5}]_9[H-SiO_{1.5}]_3$.

Results of elemental analysis

|  | C | H | F | Si | O |
|---|---|---|---|---|---|
| Theoretical value: | 22.4 | 2.0 | 43.8 | 17.2 | 14.8 |
| Measured value: | 22.4 | 2.1 | 43.5 | 16.9 | 15.1 |

IR: 2920, 2960, 2180, 1130, 1070 cm$^{-1}$
$^{29}$Si-NMR: δ(ppm)=−70.0

Comparative Example 9

A 21.8 g of $[CF_3CH_2CH_2Si(OCH3)_3]$, 3.5 g of $CH_2C(CH_3)COO(CH_2)_3Si(OCH_3)_3$ and 25 g of acetone were placed into the same equipment employed for the reaction described in Example 1 and while keeping the resulting solution at 30° C., 6.2 g of a 0.1 N-HCl aqueous solution was added dropwise thereto. After addition, the resulting reaction solution was stirred for four hours, thereby finishing the hydrolysis and condensation reactions. Then, the solvent and low boiling point materials were fractionally distilled from the reaction solution under a reduced pressure with the result that a material having a high viscosity and a light-yellow color was obtained (79%yield).

The molecular weight distribution of the product was measured by GPC in the same manner described in Example 1 with the result that a plurality of peaks including a monomer peak were found. An elemental analysis, an IR spectrum and an $^{29}$Si-NMR spectrum were conducted on the product. Three strong lines of a peak were found in the $^{29}$Si-NMR spectrum: (29Si-NMRT: δ(ppm)=−45.0, −53.2, −60.9). The positions of the peaks coincided with the peaks of monomer and one- substituted and two-substituted siloxanes.

Comparative Example 10

A 50.3 g amount of $C_4F_9SO_2N(C_3H_7)(CH_2)_3Si(OCH_3)_3$, 2.6 g of $CH_2(O)CHCH_2O(CH_2)Si(OCH_3)_3$ and 158.7 g of tetrahydrofuran as a solvent were placed into the same equipment for the reaction described in Example 5 and while keeping the resulted solution at 50° C., 0.9 g of a 0.01 N-NaOH aqueous solution was added dropwise thereto for about thirty minutes. After addition, the resulting reaction mixture was stirred for 72 hours, thereby finishing the hydrolysis and condensation reactions. The molecular weight distribution of the obtained sample was measured by GPC in the same manner described in Comparative Example 1, the result of which showed a plurality of peaks including monomer peaks.

Comparative Example 11

A 21.8 g amount of $CF_3CHCH_2Si(OCH_3)_3$, 20.7 g of $CH_2CHSi(OCH_3)_3$, 6 g of a solvent and 98 g of water were placed into the same equipment employed for the reaction described in Example 5 with gelation resulting.

Example 22

The reaction solution shown in Example 16 was filtered with a membrane filter having a pore size of 0.2 μm to remove insoluble constituents. The filtered solution was coated on a silicon substrate at a rotation speed of 5000 rpm with a spin coater which could prevent a solvent from vaporizing. Then, the coated film was dried by heating at 200° C. for 30 minutes, thereby forming a film.

The film thickness after drying was measured with a scanning electron microscope and a thickness of 0.3 μm was determined. The film obtained was colorless- transparent and was a smooth plane having no holes and projections. A circular electrode having a diameter of 2 mm was formed on the film by gold deposition and the capacitance of a portion, which was sandwiched in between the gold electrode and the silicon substrate, was measured with an LCR meter (from Nippon Hewlett-Packard:4284A). A dielectric constant of 2.9 was determined in the same manner described in Example 12.

Example 23

A film having a thickness of 0.2 μm was formed by vacuum evaporation on a silicon substrate, using the white powder obtained in Example 18, under the condition of 0.00005 Pa with a small vacuum evaporation device LUMINO (from Nippon Shinku). The dielectric constant of the film was measured in the same manner described in Example 12, the result of which was 2.8.

Comparative Example 12

A 14.5 g amount of $CH_2C(CH_3)COO(CH_2)_3Si(OC_2H_5)_3$ and 58 g of acetone were placed into the same equipment employed for the reaction described in Example 1 and while keeping the resulting solution at 50° C., 3.0 g of a 1 N-NaOH aqueous solution was added dropwise thereto for thirty minutes. After addition, the resulting reaction mixture was kept for 15 hours, thereby finishing the hydrolysis and condensation reactions. The dielectric constant of the reaction solution was measured in the same manner described in Example 12, and was found to be 3.8.

Example 24

The reaction solution shown in Example 16 was filtered with a membrane filter having a pore size of 0.2 μm to remove insoluble constituents. The filtered solution was coated on a glass substrate at a rotation speed of 5000 rpm with a spin coater which could prevent a solvent from vaporizing. Then, the coated film was dried by heating at 200° C. for 30 minutes, thereby forming a uniform film.

The contact angle of the film to water was measured using a contact angle-measurement equipment, at room temperature in the same manner described in Example 14, the result of which was 800°.

In addition, the reflectivity of the film was measured in the same manner described in Example 14, the result of which was 1.5%.

Comparative Example 13

A 10 % hydrolyzed solution of tetraethoxysilane was filtered with a membrane filter having a pore size of 0.2 μm to remove insoluble constituents. The filtered solution was coated on a glass substrate at a rotation speed of 5000 rpm with a spin coater which could prevent a solvent from vaporizing. Then, the coated film was dried by heating at 200° C. for 30 minutes, thereby forming a uniform SiO2 film.

The contact angle of the film to water was measured in the same manner as described in Example 14, the result of which was 42° C.

In addition, the reflectivity of the film was measured in the same manner described in Example 14, the result of which was 5%.

As mentioned above, the polyhedral organo-silicon compounds of the present invention can be polymerized by reactive functional groups which exist in the structure thereof with the result that a film can be formed which has excellent film-forming properties and has high strength. Further, as the compounds of the present invention can provide various copolymers with other compounds by using reactive functional groups, the compounds of the present invention can be used as a crosslinking agent.

Furthermore, as denaturation and precipitation are not induced even if preserved in the state of solution, the solubility of the compounds of the present invention is kept in good condition. In addition, as the compounds can be used in the state of solution, the compounds can be used for various wet film-forming and dry film-forming methods.

Still further, the films formed from polyhedral organosilicon compounds of the present invention are provided with water and oil repellency, and exhibit excellent adhesivity to substrates. The films exhibit a high hardness and a high transparency, and have excellent heat resistance and fire resistance, which are attributable to the siloxane bonds. In addition, as the films have a low refractive index and a low dielectric constant, the films are useful as films having a low reflectivity and as dielectric films. The films are also suitable for patterning by heat such as by laser, and also can be used as resist films since the films can be dissolved in an organic solvent.

In the present invention, the above-mentioned organosilicon compounds represented by formulas (I) to (III) can be easily produced.

What is claimed as new and is intended to be secured by Letters Patent is:

1. A perfluoroalkyl group containing organosilicon compound having a polyhedral structure and having the formula (I):

$$[Rf1-X1-(CH_2)_a-SiO_{1.5}]_m \quad (I)$$

wherein Rf1 is a $C_{1-20}$-perfluoroalkyl, X1 is a divalent bonding group, a is 0 or an integer of up to 10, and m is an integer of 4 to 20.

2. A perfluoroalkyl group containing organosilicon compound having a polyhedral structure and having the formula (II):

$$[Rf1-X1-(CH_2)_a-SiO_{1.5}]_m[Rf2-(X2)_c-(CH_2)_b-SiO_{1.5}]_n \quad (II),$$

wherein each of Rf1 and Rf2 is a $C_{1-20}$-perfluoroalkyl group, each of X1 and X2 is a divalent bonding group, each of a and b is 0 or an integer of up to 10, c is 0 or 1, each of m and n is an integer of 1 to 19 and m+n is an integer of 4 to 20, and at least one combination selected from the group consisting of Rf1 and Rf2, X1 and X2, and a and b is such that the members of the group are not the same.

3. A perfluoroalkyl group containing organosilicon compound which contains reactive functional groups, has a polyhedral structure and has the formula (III):

$$[Rf1-X1-(CH_2)_a-SiO_{1.5}]_m[R-(X2)_c-(CH_2)_b-SiO_{1.5}]_n \quad (III),$$

wherein Rf1 is a $C_{1-16}$-perfluoroalkyl group, R is a reactive functional group, each of X1 and X2 is a divalent bonding group, each of a and b is 0 or an integer of up to 10, c is 0 or 1, each of m and n is an integer of 1 to 19 and m+n is an integer of 4 to 20.

4. The polyhedral organosilicon compound as claimed in claim 1, wherein bonding group X1 or X2 is a member selected from the group consisting of —CH$_2$—, —O—, —N(R1)—, —S—, —SO$_2$N(R1)—, —COO— and —CON(R1)—, wherein R1 is hydrogen, a $C_{1-10}$-alkyl group or a $C_{1-10}$-alkenyl group.

5. The polyhedral organosilicon compound as claimed in claim 2, wherein bonding group X1 or X2 is a member selected from the group consisting of —CH$_2$—, —O—, —N(R1)—, —S—, —SO$_2$N(R1)—, —COO— and —CON(R1)—, wherein R1 is hydrogen, a $C_{1-10}$-alkyl group or a $C_{1-10}$-alkenyl group.

6. The polyhedral organosilicon compound as claimed in claim 3, wherein bonding group X1 or X2 is a member selected from the group consisting of —CH$_2$—, —O—, —N(R1)—, —S—, —SO$_2$N(R1)—, —COO— and —CON(R1)—, wherein R1 is hydrogen, a $C_{1-10}$-alkyl group or a $C_{1-10}$-alkenyl group.

7. The polyhedral organosilicon compound as claimed in claim 2, wherein, each perfluoroalkyl group of Rf1 and Rf2 has from 1 to 10 carbon atoms; the bonding group X1 is —CH$_2$—, —CONH— or —SO$_2$N(C$_3$H$_7$)— and a is from 0 to 5; and the bonding group X2 is —CH$_2$O—, CH$_2$— or —C$_3$H$_6$—, and b is from 0 to 5 and c is 1.

8. The polyhedral organosilicon compound as claimed in claim 3, wherein, each perfluoroalkyl group of Rf1 and Rf2 has from 1 to 10 carbon atoms; the bonding group X1 is —CH$_2$—, —CONH— or —SO$_2$N(C$_3$H$_7$)— and a is from 0 to 5; and the bonding group X2 is —CH$_2$O—, —CH$_2$— or —C$_3$H$_6$—, and b is from 0 to 5 and c is 1.

9. The polyhedral organosilicon compound as claimed in claim 3, wherein reactive functional group R is a member selected from the group consisting of a vinyl group, an acrylic group, a methacrylic group, an epoxy group, an amino group, a mercapto group, an isocyanate group and hydrogen.

10. A method for producing a polyhedral organosilicon compound, which comprises:

hydrolyzing and condensing a silicon compound of formula (IV) below or two different compounds one of which has formula (IV) and the other has either formula (V) below or (VI) below in a solvent and water in the presence of a basic compound as a catalyst to provide a product compound having formula (I), (II) or (III):

$$Rf1-X1-(CH_2)_a-Si(Y)_3 \quad (IV)$$

$$Rf2-(X2)_c-(CH_2)_b-Si(Y)_3 \quad (V)$$

$$R-(X2)_c-(CH_2)_b-Si(Y)_3 \quad (VI),$$

wherein Y is a $C_{1-5}$-alkoxy group or chlorine, $$[Rf1-X1-(CH_2)_a-SiO_{1.5}]_m \quad (I),$$

$$[Rf1-X1-(CH_2)_a-SiO_{1.5}]_m[Rf2-(X2)_c-(CH_2)_b-SiO_{1.5}]_n \quad (II),$$

$$[Rf1-X1-(CH_2)_a-SiO_{1.5}]_m[R-(X2)_c-(CH_2)_b-SiO_{1.5}]_n \quad (III),$$

wherein in formula (I), Rf1 is a $C_{1-20}$-perfluoroalkyl, X1 is a divalent bonding group, a is 0 or an integer of up to 10, and m is an integer of 4 to 20;

in formula (II), each of Rf1 and Rf2 is a $C_{1-20}$-perfluoroalkyl group, each of X1 and X2 is a divalent bonding group, each of a and b is 0 or an integer of up to 10, c is 0 or 1, each of m and n is an integer of 1 to 19 and m+n is an integer of 4 to 20, and at least one combination selected from the group consisting of Rf1 and Rf2, X1 and X2, and a and b is such that the members of the group are not the same;

and in formula (III), Rf1 is a $C_{1-16}$-perfluoroalkyl group, R is a reactive functional group, each of X1 and X2 is a divalent bonding group, each of a and b is 0 or an integer of up to 10, c is 0 or 1, each of m and n is an integer of 1 to 19 and m+n is an integer of 4 to 20.

11. The method of claim 10, wherein said solvent is an organic solvent containing at least one element selected from the group consisting of O, N,F and Cl and basic compound is a metal hydroxide, an amine compound or a quarternary ammonium hydroxide.

12. The method of claim 10, wherein the amount of said basic compound is $1.0 \times 10^{-5}$ to 2 mol. relative to one mol. of a compound having formula (IV) or a compound mixture having formula (IV) in combination with either formula (V) or formula (VI), and the amount of water added is 1.5 to 6 mol. relative to one mol. of a compound having formula (IV) or a compound mixture having formula (IV) in combination with either formula (V) or formula (VI).

13. The method of claim 11, wherein the amount of said basic compound is $10 \times 10^{-5}$ to 2 mol. relative to one mol. of a compound having formula (IV) or a compound mixture having formula (IV) in combination with either formula (V) or formula (VI), and the amount of water added is 1.5 to 6 mol. relative to one mol. of a compound having formula (IV) or a compound mixture having formula (IV) in combination with either formula (V) or formula (VI).

14. The method of claim 10, wherein the hydrolysis and condensation reactions are conducted at 10° C. to 150° C.

15. The method of claim 11, wherein the hydrolysis and condensation reactions are conducted at 10° C. to 150° C.

16. The method of claim 12, wherein the hydrolysis and condensation reactions are conducted at 10° C. to 150° C.

17. A material for forming a film of a polyhedral organosilicon compound, comprising:

the polyhedral organosilicon compound of claim 1 dissolved in a solvent.

18. A material for forming a film of a polyhedral organosilicon compound, comprising:

the polyhedral organosilicon compound of claim 2 dissolved in a solvent.

19. A material for forming a film of a polyhedral organosilicon compound, comprising:

the polyhedral organosilicon compound of claim 3 dissolved in a solvent.

20. A film having a low dielectric constant, a low reflectivity, a high transparency, water and oil-repellency and which can be patterned, prepared from the polyhedral organosilicon compound of claim 1.

21. A film having a low dielectric constant, a low reflectivity, a high transparency, water and oil-repellency and which can be patterned, prepared from the polyhedral organosilicon compound of claim 2.

22. A film having a low dielectric constant, a low reflectivity, a high transparency, water and oil-repellency and which can be patterned, prepared from the polyhedral organosilicon compound of claim 3.

23. The polyhedral organosilicon compound according to claim 1, which is useful as a crosslinking agent, a polymer material or a resist material.

24. The polyhedral organosilicon compound according to claim 2, which is useful as a crosslinking agent, a polymer material or a resist material.

25. The polyhedral organosilicon compound according to claim 3, which is useful as a crosslinking agent, a polymer material or a resist material.

* * * * *